(12) United States Patent
Santos et al.

(10) Patent No.: US 9,312,730 B2
(45) Date of Patent: Apr. 12, 2016

(54) STATOR WITH A POLYMERIC CASING FOR AN ELECTRIC MOTOR OF A WASHING MACHINE AND METHOD OF MANUFACTURING THE SAME

(71) Applicant: Whirlpool Corporation, Benton Harbor, MI (US)

(72) Inventors: Hideraldo Vasconcelos Santos, Joinville (BR); Orlando Starke, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 623 days.

(21) Appl. No.: 13/649,135

(22) Filed: Oct. 11, 2012

(65) Prior Publication Data

US 2014/0103777 A1    Apr. 17, 2014

(51) Int. Cl.
| | |
|---|---|
| H02K 15/10 | (2006.01) |
| H02K 1/14 | (2006.01) |
| H02K 15/02 | (2006.01) |
| H02K 3/52 | (2006.01) |
| H02K 15/095 | (2006.01) |
| H02K 15/12 | (2006.01) |

(52) U.S. Cl.
CPC .............. *H02K 1/148* (2013.01); *H02K 15/022* (2013.01); *H02K 3/522* (2013.01); *H02K 15/095* (2013.01); *H02K 15/12* (2013.01); *H02K 2203/12* (2013.01); *Y10T 29/49009* (2015.01)

(58) Field of Classification Search
CPC ............................... H02K 1/148; H02K 15/10
USPC ......... 310/254.1, 216.008–216.009, 216.099; 29/596
See application file for complete search history.

(56) References Cited

U.S. PATENT DOCUMENTS

| | | | |
|---|---|---|---|
| 3,096,451 A | 7/1963 | Daugherty et al. | |
| 4,823,032 A | 4/1989 | Ward et al. | |
| 6,081,059 A | 6/2000 | Hsu | |
| 6,487,769 B2 | 12/2002 | Ketterer et al. | |
| 6,737,785 B2 | 5/2004 | De Luca et al. | |
| 6,756,716 B2 | 6/2004 | Siems et al. | |
| 6,844,653 B2 | 1/2005 | Kolomeitsev et al. | |
| 7,586,228 B2 | 9/2009 | Best | |
| 7,821,175 B2 | 10/2010 | Ionel et al. | |
| 7,900,339 B2 | 3/2011 | Makino | |
| 8,129,880 B2 | 3/2012 | Rahman et al. | |
| 8,198,765 B2 | 6/2012 | Owng et al. | |
| 2003/0214197 A1* | 11/2003 | De Luca et al. | 310/218 |
| 2004/0189136 A1* | 9/2004 | Kolomeitsev et al. | 310/214 |
| 2005/0242670 A1* | 11/2005 | Lee | 310/43 |
| 2007/0013256 A1* | 1/2007 | Sheeran et al. | 29/596 |
| 2007/0205682 A1* | 9/2007 | Choi et al. | 310/266 |
| 2007/0296302 A1* | 12/2007 | Fei et al. | 310/218 |
| 2010/0307202 A1 | 12/2010 | Maentele et al. | |
| 2011/0037338 A1 | 2/2011 | Leiber et al. | |
| 2011/0074254 A1* | 3/2011 | Critchley et al. | 310/60 R |

* cited by examiner

Primary Examiner — Michael Andrews

(57) ABSTRACT

A stator for an electric motor and method of manufacturing the stator is disclosed. The stator has a stator core including an annular yoke and a plurality of teeth, a plurality of polymeric casings formed over the plurality of teeth, and plurality of polymeric bridges that extend between the polymeric casings. Each polymeric bridge connects the radial ends of adjacent teeth. A shell separate from the polymeric casings is formed over the annular yoke.

16 Claims, 10 Drawing Sheets

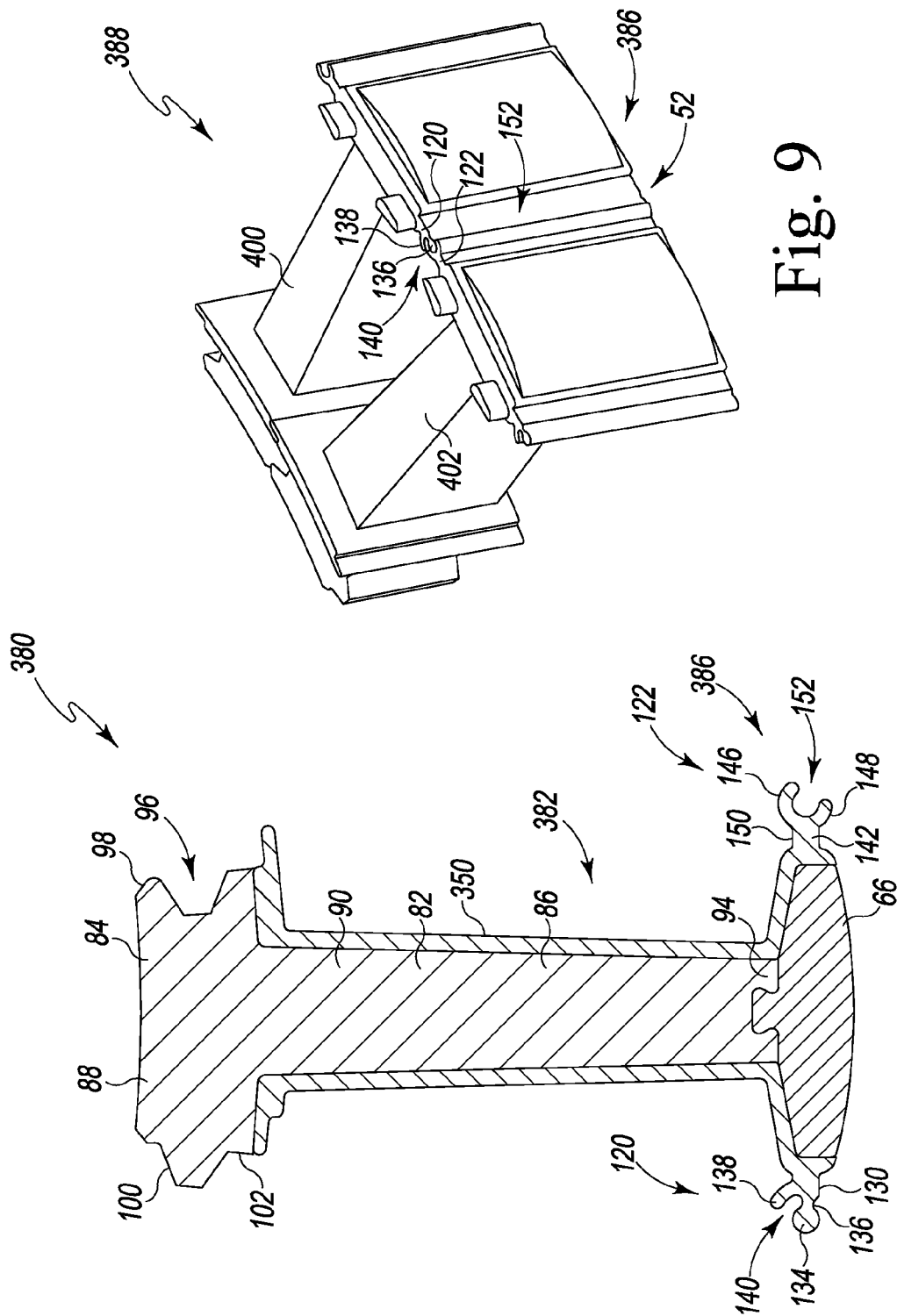

STATOR WITH A POLYMERIC CASING FOR AN ELECTRIC MOTOR OF A WASHING MACHINE AND METHOD OF MANUFACTURING THE SAME

TECHNICAL FIELD

The present disclosure relates generally to an electric motor for a washing machine, and, more particularly, to a stator for an electric motor of a washing machine.

BACKGROUND

A washing machine is a domestic appliance for cleaning clothes, linens, and other laundry. A washing machine may include a tub and a drum positioned in the tub that is sized to receive laundry for cleaning. The washing machine may include an electric motor that causes the drum to rotate relative to the tub during a washing operation. In some washing machines, the electric motor may be connected to the drum via a transmission system including, for example, belts and pulleys. The electric motor may also be connected to the drum via a drive shaft. Washing machines including the latter type of electric motor are often referred to as "direct drive" washing machines.

Electric motors typically include a stator and a rotor configured to rotate relative to the stator. The stator may be fixed to the tub of the washing machine and may include a number of stator field coils. The rotor may include one or more magnets that interact with the stator coils.

During operation, the stator coils may be sequentially energized with electricity to create an electromagnetic field that rotates the rotor. The electromagnetic field generates tangential magnetic forces that act on the stator and may cause the stator to vibrate and create undesired acoustic noise.

SUMMARY

According to one aspect, a method of manufacturing a stator for a washing machine is disclosed. The method includes forming a plurality of stator segments, and each stator segment includes a yoke section, a tooth body extending outwardly from the yoke section to an end, and a shoe at the end of the tooth body. The method also includes forming a polymeric casing on each stator segment, and each polymeric casing extends over only the tooth body and the shoe of the stator segment such that the yoke section of the stator segment is devoid of polymeric material. The method includes engaging the yoke sections of the stator segments to form an annular yoke, and forming a central shell on the annular yoke. The central shell includes a plurality of bores for mounting the stator. A polymeric bridge extends between the polymeric casings and connects the shoes of adjacent stator segments.

In some embodiments, forming the polymeric casing on each stator segment may include overmolding a plurality of stator segments with polymeric material. The polymeric bridges may be formed integrally with the polymeric casings.

In some embodiments, forming the polymeric casing on a stator segment may include forming a tab on a first side of the shoe of the stator segment and forming a notch on a second side of the shoe of the stator segment. Additionally, in some embodiments, the method may include assembling a chain of stator segments by positioning the tab of a first stator segment in a notch of a second stator segment.

In some embodiments, forming the polymeric casing may include overmolding a number of stator segments of the plurality of stator segments with polymeric material to form a chain of stator segments. Each stator segment of the chain may be connected by a polymeric bridge. In some embodiments, the chain of stator segments may be a first chain of stator segments. Additionally, in some embodiments, forming the polymeric casing may include overmolding a second number of stator segments with polymeric material to form a second chain of stator segments.

In some embodiments, the method may also include connecting a first shoe of the first chain of stator segments with a last shoe of the second chain of stator segments before engaging the yoke sections of the stator segments.

In some embodiments, overmolding a number of stator segments may include forming a pin at one end of the first chain and defining a notch at one end of the second chain. Additionally, in some embodiments, connecting the first shoe of the first chain with the last shoe of the second chain may include positioning the pin of the first chain in the notch of the second chain to form the polymeric bridge between the first shoe of the first chain and the last shoe of the second chain.

In some embodiments, the method may include forming the polymeric bridge between each stator segment by welding adjacent polymeric casings. In some embodiments, the method may include forming the polymeric bridge between each stator segment by gluing adjacent polymeric casings.

In some embodiments, overmolding a number of stator segments may include forming a first passageway at one end of the first chain and forming a second passageway at one end of the second chain. Connecting the first shoe of the first chain with the last shoe of the second chain may include positioning a pin in the first passageway of the first chain and in the second passageway of the second chain to form the polymeric bridge between the first shoe of the first chain and the last shoe of the second chain.

In some embodiments, the method may include winding a coil around each tooth body after forming the polymeric casing.

In some embodiments, engaging the yoke sections of the stator segments may include positioning a tab of the yoke section of a first stator segment in a groove formed in the yoke section of a second stator segment. In some embodiments, forming the central shell on the annular yoke may include overmolding the annular yoke.

According to another aspect, a stator for an electric motor is disclosed. The stator has a stator core including an annular yoke and a plurality of teeth, and each tooth extends from the annular yoke to a radial end. The stator also includes a polymeric shell formed over the plurality of teeth. The polymeric shell includes a casing formed over each tooth and a plurality of bridges. Each bridge connects the radial ends of adjacent teeth. The stator also includes a central shell separate from the polymeric shell, and the central shell is formed over the annular yoke.

In some embodiments, the stator core may include a plurality of stator segments. Each stator segment may include a yoke section of the annular yoke, a tooth body extending from the yoke section, and a shoe attached to the tooth body at the radial end of the tooth. Additionally, in some embodiments, the bridges may be formed integrally with the casings.

In some embodiments, each bridge may include a notch defined on a first side of a first tooth, and a pin extending from a second side of a second tooth. The pin of the second tooth may be positioned in the notch of the first tooth.

In some embodiments, a first plurality of stator segments may be connected by a first plurality of bridges formed integrally with a first plurality of casings, and a second plurality of stator segments may be connected by a second plurality of bridges formed integrally with a second plurality of casings. In some embodiments, the first plurality of stator segments may be joined with the second plurality of stator segments via a fastener.

Additionally, in some embodiments, the fastener may include a notch defined on one end of the first plurality of stator segments and a pin formed on one end of the second plurality of stator segments. The pin may be received in the notch of the first plurality of stator segments.

In some embodiments, the fastener may include a first passageway defined on one end of the first plurality of stator segments, a second passageway defined on one end of the second plurality of stator segments, and a pin received in the first passageway and the second passageway.

In some embodiments, the polymeric shell may be formed from a first polymeric material and the central shell may be formed from a second polymeric material different from the first polymeric material. In some embodiments, the polymeric shell may be formed from a polymeric material and the central shell is formed from a metallic material.

According to another aspect, the method manufacturing a stator includes forming a plurality of stator segments, and each stator segment includes a yoke section, a tooth body extending outwardly from the yoke section to an end, and a shoe secured to the end of the tooth body. The method also includes forming a plurality of separate stator segment chains with a polymeric material. The first polymeric material extends over the tooth body and the shoe of the each stator segment such that the yoke sections of the stator segment chains are devoid of polymeric material. The method includes assembling the separate stator segment chains into a string of stator segment chains, engaging the yoke sections of the stator segments to form an annular yoke of the stator, and forming a central shell on the annular yoke of the stator. The central shell is formed from a second material different from the first polymeric material. A polymeric bridge connects the shoes of adjacent stator segments.

BRIEF DESCRIPTION OF THE DRAWINGS

The detailed description particularly refers to the following figures, in which:

FIG. 8 is a cross-sectional plan view of a stator segment of another embodiment of a stator segment assembly; and FIG. 9 is a perspective view of the stator segment of FIG. 8 secured to another stator segment.

DETAILED DESCRIPTION OF THE DRAWINGS

Figure 1:
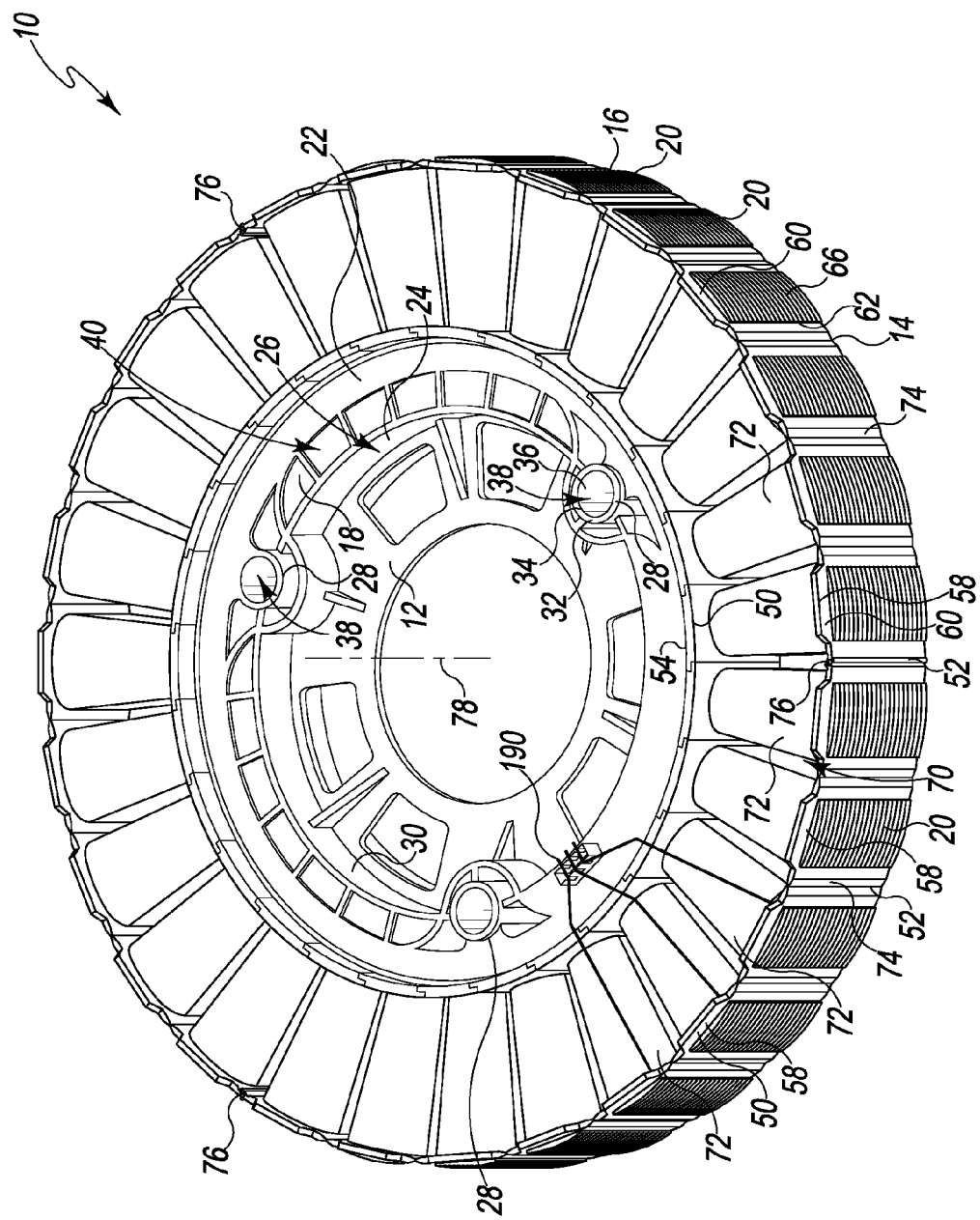
FIG. 1 is a perspective view of one embodiment of a stator assembly of an electric motor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, one embodiment of a stator assembly 10 for an electric motor of a washing machine is shown. One example of an electric motor is shown and described in U.S. Patent App. Pub. No. 2010/0307202, entitled "WASHING MACHINE WITH A DIRECT DRIVE SYSTEM," which is incorporated herein by reference. The stator 10 includes a central shell 12, an insulator shell 14, and a stator core 16 positioned in the shells 12, 14. In the illustrative embodiment, the stator core 16 includes an annular yoke 18 (see FIG. 7) and a plurality of teeth 20 that extend outwardly from the yoke 18.

The central shell 12 of the stator assembly 10 is formed on the annular yoke 18 of the stator core 16. The central shell 12 is formed from a polymeric material, such as, for example, a plastic resin, which is molded over the annular yoke 18 via an injection molding process, as described in greater detail below. In the illustrative embodiment, the plastic resin is a fiber-reinforced plastic such as, for example, SMC and BMC. The central shell 12 has an outer annular surface 22 and an inner surface 24 that extends inwardly from the surface 22. As shown in FIG. 1, the inner surface 24 defines an aperture 26 in the central shell 12.

In the illustrative embodiment, the shell 12 also includes a number of mounting brackets 28 positioned around the outer circumference 30 of the aperture 26. Each mounting bracket 28 includes an outer face 32 that has a circular opening 34 defined therein. An inner surface 36 extends inwardly from the opening 34 to define a bore 38 through each bracket 28. Each bore 38 is sized to receive a fastener (not shown), such as, for example, a bolt or other threaded rod. During the assembly of the washing machine, the fasteners are advanced through the bores 38 to engage the tub of the washing machine and thereby secure the stator assembly 10 to the tub of the washing machine.

As described above, the stator assembly 10 also includes an insulator shell 14 that is formed on the stator core 16 separate from the central shell 12. In particular, the insulator shell 14 is formed over the teeth 20 of the stator core 16. The shell 14 is formed from a polymeric material, such as, for example, a thermoplastic resin, which is molded over the teeth 20 via one or more injection molding processes, as described in greater detail below. As shown in FIG. 1, the shell 14 includes a plurality of casings 50 formed over the teeth 20 of the stator core 16 and a plurality of bridges 52 that extend between the casings 50.

Each casing 50 includes a base plate 54 and a body 56 (see FIG. 4A) that extends outwardly from the base plate 54 to a radial end 60. Each casing 50 also has an end plate 58 that extends outwardly from the radial end 60 of the body 56. As shown in FIG. 1, each end plate 58 has an opening 62 defined therein. Each tooth 20 of the stator core 16 has a tooth end piece or shoe 66 extending from each opening 62 of the shell 14.

The stator assembly 10 has a number of coil slots 70 defined between the casings 50 of the shell 14. Each coil slot 70 is sized to receive a field coil 72 of the stator 10. The field coils 72 are wrapped around the casings 50 (and hence teeth 64) of the stator assembly 10. In operation, the field coils 72 form the three-phases of the motor and are energized selectively to generate an electromagnetic field around the teeth 20 of the stator core 16. As the field coils 72 are energized, the shoes 66 of teeth 20 function as electromagnets that interact with the permanent magnets of the rotor (not shown) to rotate the rotor. It should also be appreciated that in other embodiments the field coils may form a bi-phase system.

As described above, the insulator shell 14 includes a plurality of bridges 52 that extend between the casings 50. As shown in FIG. 1, each bridge 52 extends across the coil slot 70 defined between adjacent end plates 58 of the casings 50. In that way, the bridges 52 interconnect adjacent teeth 20 in the region where magnetic forces act on the stator assembly 10 (i.e., at the tooth shoes 66). Each bridge 52 is sized and configured to resist tangential magnetic forces generated by the electromagnetic field, thereby reducing vibration of the stator assembly 10 and hence undesired acoustic noise. As described in greater detail below, the bridges 52 of the insulator shell 14 include a plurality of clamping plates 74 and a plurality of hinge plates 76 that extend between the casings 50, as described in greater detail below.

As shown in FIG. 1, the stator core 16 of the stator assembly 10 defines a longitudinal axis 78. In the illustrative embodiment, the stator assembly 10 is an inner stator assembly, which is positioned in the center of the electric motor and surrounded by an outer rotor. As a result, the teeth 20 of the stator core 16 extend radially outward from the longitudinal axis 78 of the stator assembly 10. It should be appreciated that in other embodiments the stator assembly 10 may be an outer stator that surrounds an inner rotor located in the center of the electric motor. In such embodiments, the teeth of the stator core extend radially inward toward the longitudinal axis of the stator.

Figure 2:
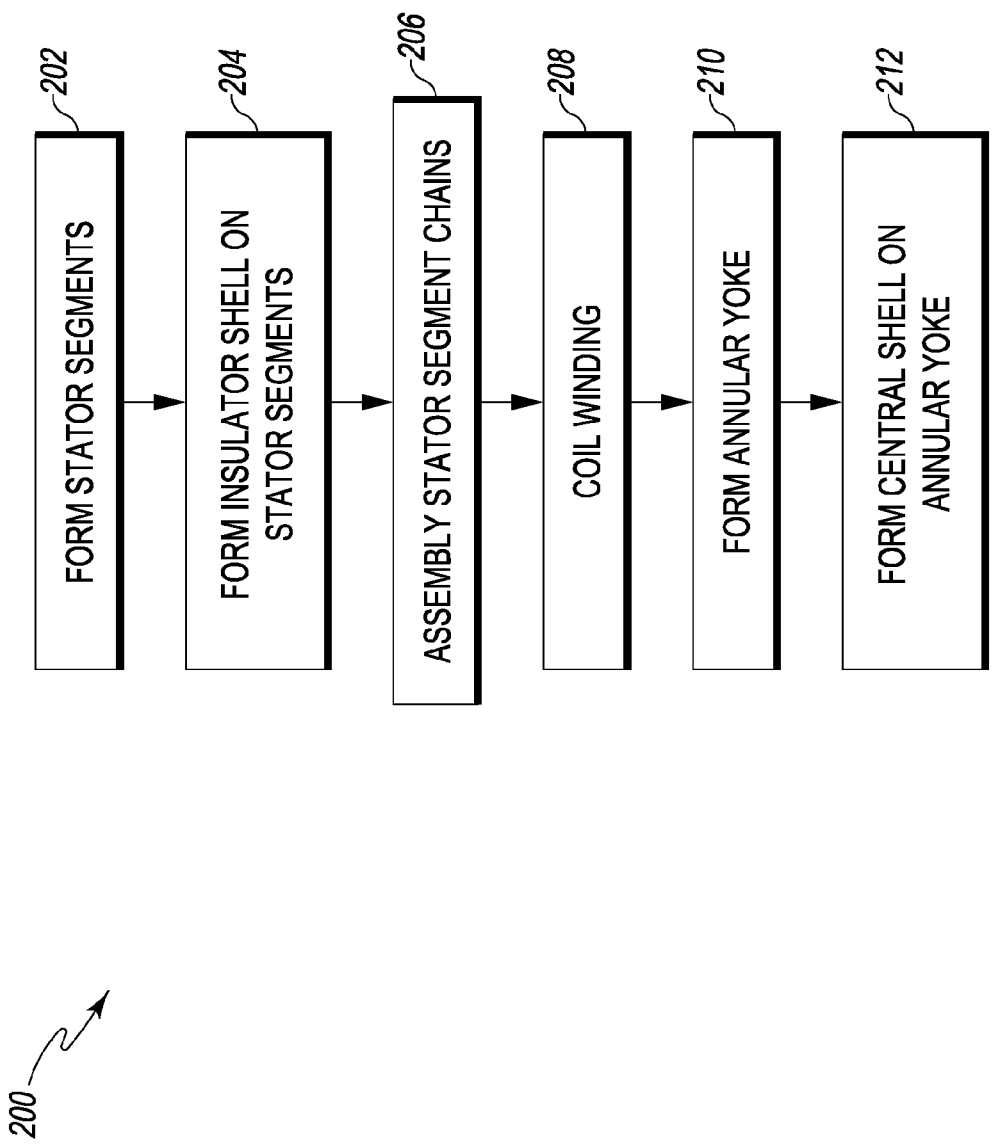
FIG. 2 is a flow chart of a method of manufacturing the stator assembly of FIG. 1.

Referring now to FIG. 2, an exemplary method of manufacturing the stator assembly 10 (hereinafter method 200) is shown. The method 200 includes block 202 in which a plurality of stator segments 80 are formed. As described in greater detail below, the stator segments 80 are formed separately and then assembled to form the stator core 16. In the illustrative embodiment, the stator core 16 is formed from twenty-seven stator segments 80.

Figure 3A:
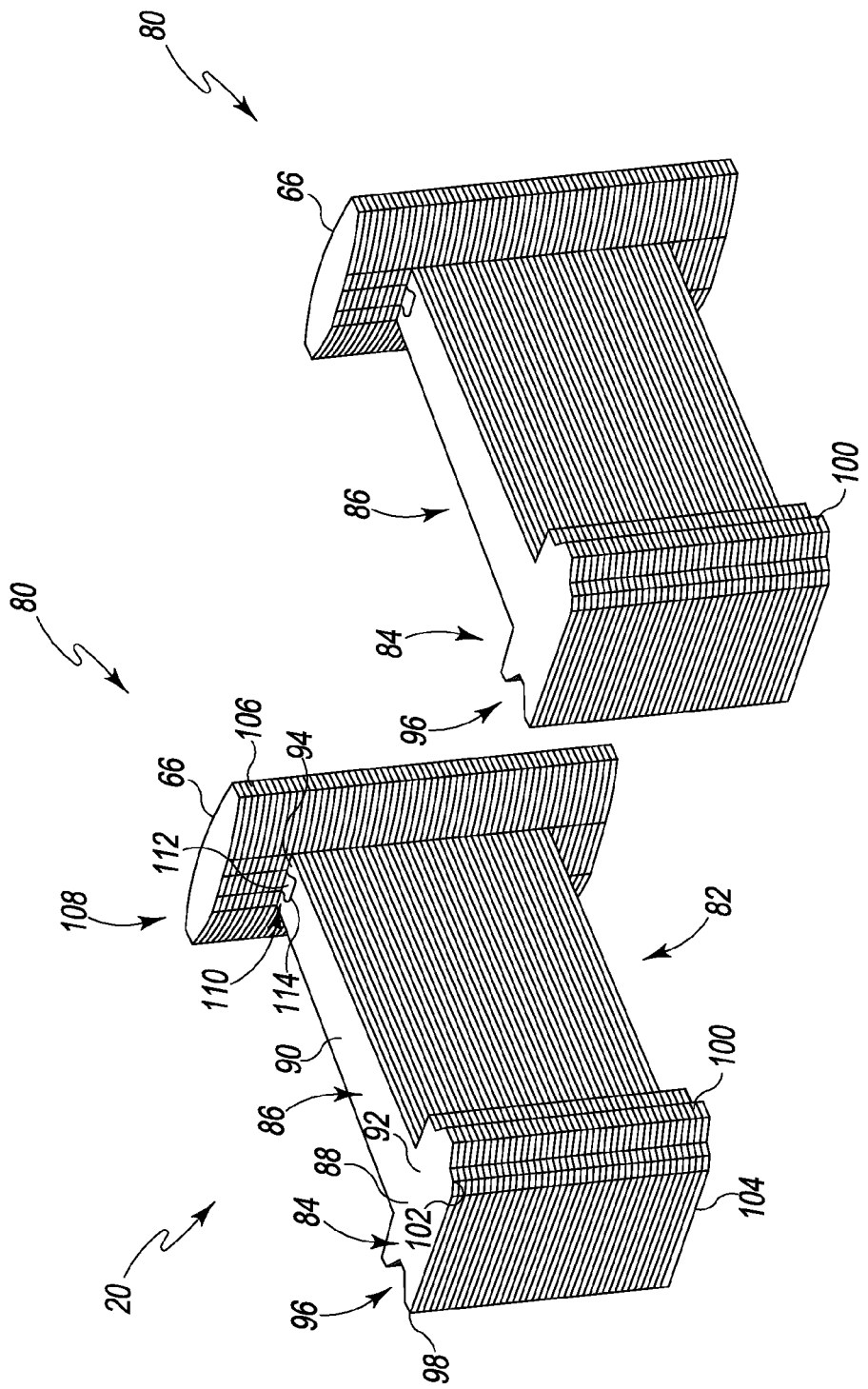
FIG. 3A is a perspective view of stator segments of the stator assembly of FIG. 1.

As shown in FIG. 3A, each stator segment 80 includes a segment body 82 and an end piece or shoe 66 that is secured to the segment body 82. The segment body 82 of each stator segment 80 includes a yoke section 84 and one tooth 86 of the plurality of teeth 20 of the stator core 16. The yoke section 84 has a base 88, and the tooth 86 has a tooth body 90 that extends from an end 92 attached to the base 88 to an end 94. The base 88 has a groove 96 defined on one side 98 thereof and a dowel 100 that extends outwardly from the opposite side 102 thereof. As described in greater detail below, the groove 96 of each yoke section 84 is sized to receive the dowel 100 of an adjacent yoke section 84.

The tooth head or shoe 66 is secured to the end 94 of the tooth 86. In the illustrative embodiment, the shoe 66 is formed separately from the tooth 86 and attached to the tooth 86 during a subsequent assembly step to produce one stator segment 80. The process is repeated for each stator segment 80 of the stator core 16.

As shown in FIG. 3A, each segment body 82 is formed from a plurality of stacked laminations 104. Each lamination 104 is formed from a metallic material, such as, for example, steel. The segment body 82 may be manufactured by producing a number of generally flat metal plates or laminations 104 via a progressive stamping process. After a lamination 104 is produced, the lamination 104 may be stacked with other laminations 104 to form the segment body 82.

The shoe 66 of each stator segment 80 is similarly formed from a plurality of stacked laminations 106. Each lamination 106 is formed from a metallic material, such as, for example, steel, and may be produced via a progressive stamping process. In the illustrative embodiment, each lamination 106 of the shoe 66 has an oblong shape. In other embodiments, the lamination 106 may have a substantially rectangular, oval, or other suitable geometric shape. It should also be appreciated that in other embodiments the shoe 66 may be formed from a composite material including polymeric and metallic elements such as, for example, a soft magnetic composite (SMC). After a lamination 106 is produced, the lamination 106 may be stacked with other laminations 106 to form the shoe 66.

The shoe 66 is attached to a segment body 82 via a locking mechanism 108. In the illustrative embodiment, each locking mechanism 108 is a dovetail joint 110 that secures the shoe 66 to the end 94 of the tooth 86. The joint 110 includes a pin 112 that extends outwardly from the shoe 66. The pin 112 has a trapezoidal cross-section and is formed by the stacked laminations 106 of the shoe 66. The joint 110 includes a corresponding trapezoidal-shaped channel 114 defined in the end 94 of the tooth 86. In the illustrative embodiment, the shoe 66 is secured to the segment body 82 via a press fit. In that way, a stator segment 80 of the stator core 16 is produced. In other embodiments, the shoe 66 may be attached to the segment body 82 by a welding process from one end to the other end of the tooth 86.

Figure 3B:
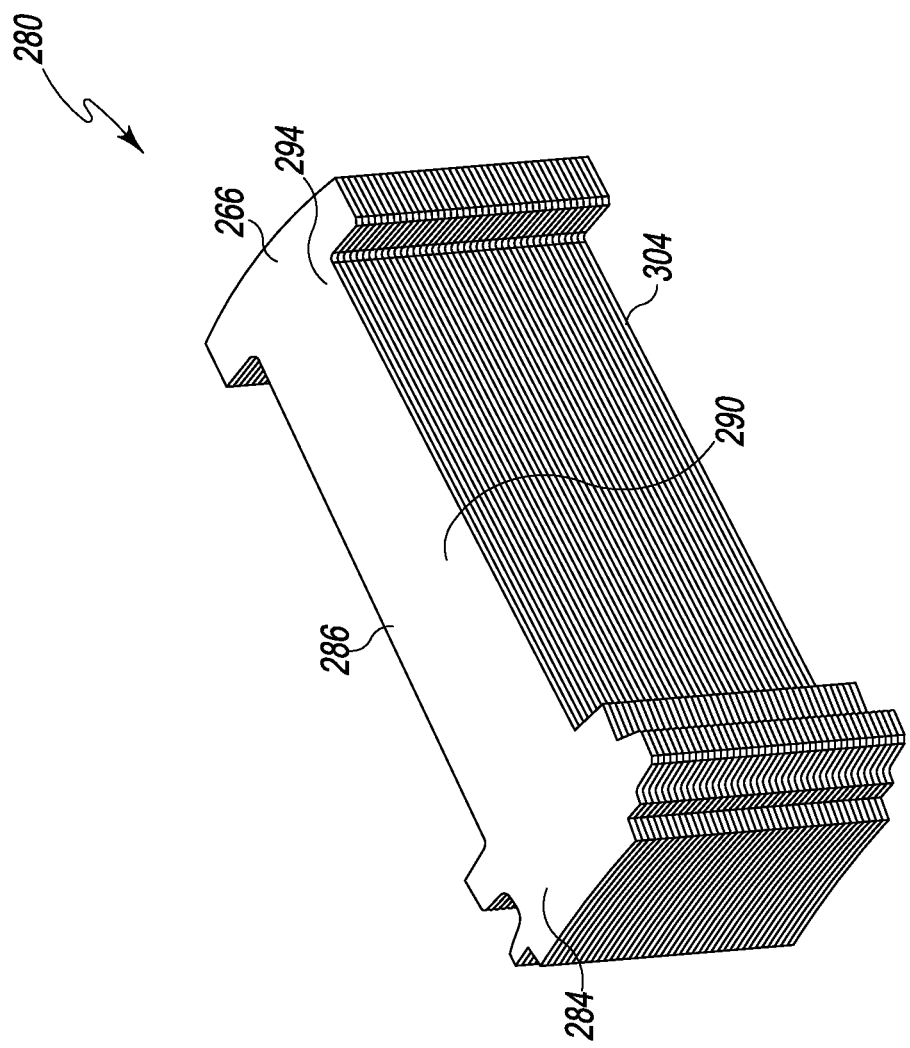
FIG. 3B is a perspective view of another embodiment of a stator segment.

It should be appreciated that in other embodiments the shoe may be integrally formed with the body of the tooth. For example, as shown in FIG. 3B, a stator segment 280 includes a yoke section 284 and one tooth 286. The tooth 286 includes has a tooth body 290 extending from the yoke section 284 and a shoe 266 positioned at an end 294 of the tooth body 290. The segment 280 is formed from a plurality of stacked laminations 304. Each lamination 304 is formed from a metallic material, such as, for example, steel. The segment 280 may be manufactured by producing a number of generally flat metal plates or laminations 304 via a progressive stamping process. After a lamination 304 is produced, the lamination 304 may be stacked with other laminations 304 to form the segment 280.

Figure 4A:
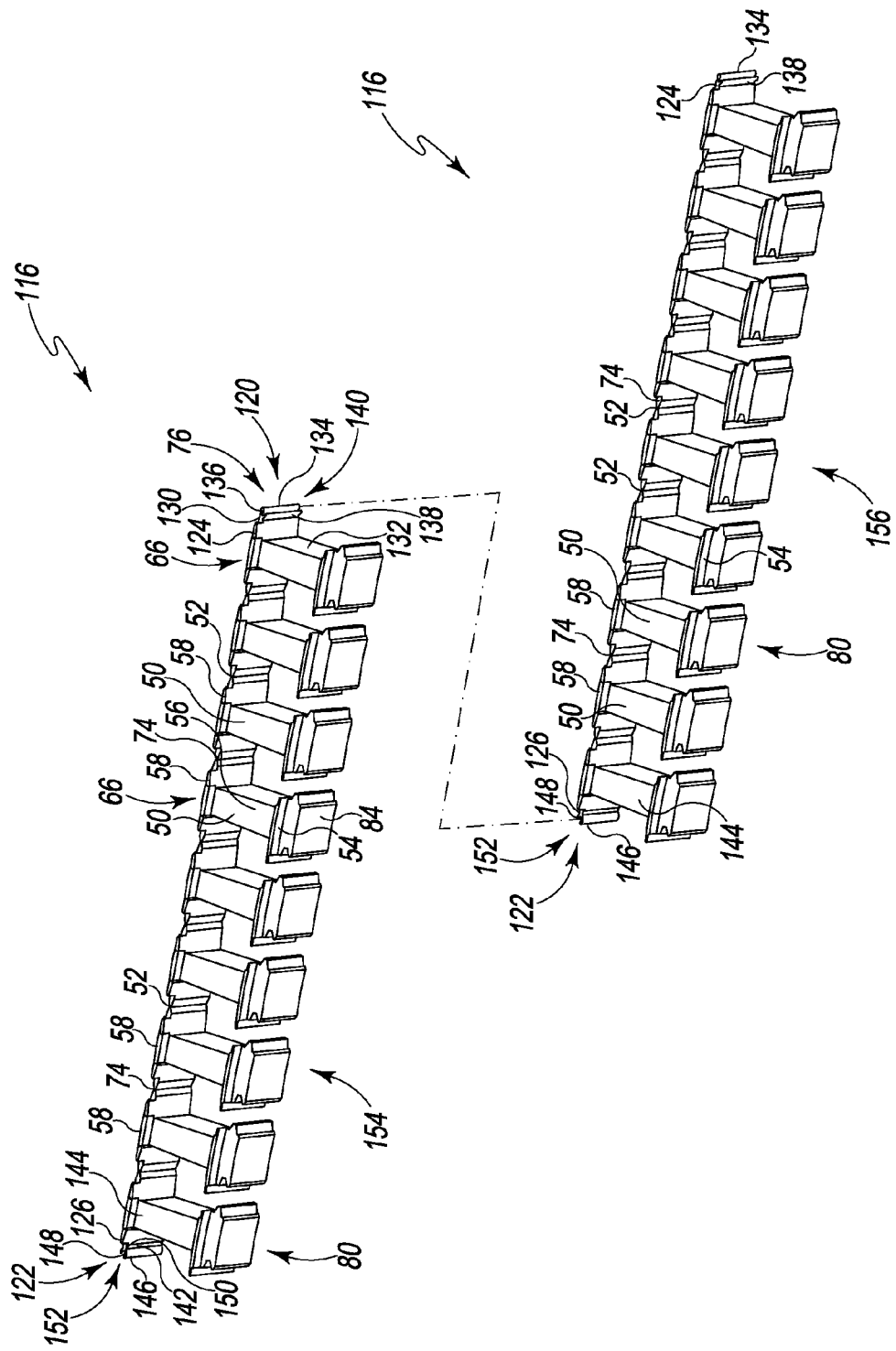
FIG. 4A is a perspective view of stator segment chains of the stator assembly of FIG. 1.

Returning to FIG. 2, after each of the stator segments 80 of the stator core 16 is manufactured, the method 200 may advance to block 204. In block 204, the insulator shell 14 of the stator assembly 10 is formed over the stator segments 80. In the illustrative embodiment, the shell 14 is formed in an injection molding process. To do so, a number of stator segments 80 may be placed in a mold. A polymeric material in liquid form is injected into the mold and is permitted to flow over the tooth body 90 and the shoe 66 of each stator segment 80. The mold is configured such that the yoke section 84 is isolated from the polymeric material. When the material cools, a casing 50 is formed over the tooth body 90 and the shoe 66 of each stator segment 80. As shown in FIG. 4A, the yoke section 84 of each stator segment 80 is devoid of polymeric material.

As described above, the shell 14 includes a plurality of bridges 52 that extend between the end plates 58 of the casings 50 (and hence the shoes 66 of the teeth 20). As shown in FIG. 4A, the bridges 52 include a number of clamping plates 74 that extend between the end plates 58 of the casings 50, thereby forming a chain 116 of stator segments. In the illustrative embodiment, each clamping plate 74 is integrally formed with the casings 50 and connects together consecutive shoes 66 of the teeth 86. Each plate 74 has a thickness of approximately 1 millimeter and is flexible such that the stator segments 80 may be bent relative to one another.

In the illustrative embodiment, the stator segment chain 116 includes one-third of the segments 80 of the stator core 16 (i.e., nine stator segments 80). In other embodiments, the stator segment chain may include any fraction of stator segments. As such, the injection molding process is repeated to produce additional chains 116 of stator segments for the stator core 16 for later assembly. In that way, the insulator shell 14 is formed in a series of injection molding operations. It should be appreciated that in other embodiments a single chain of stator segments, which includes all of the segments of the stator core, may be produced. In such embodiments, the insulator shell 14 may be produced in a single injection molding operation. It should also be appreciated that in other embodiments each stator segment may be overmolded separately and later assembled into a chain of stator segments. In such embodiments, fasteners may be used to assemble the stator segments together, as described in greater detail below in reference to FIGS. 8 and 9.

Figure 5:
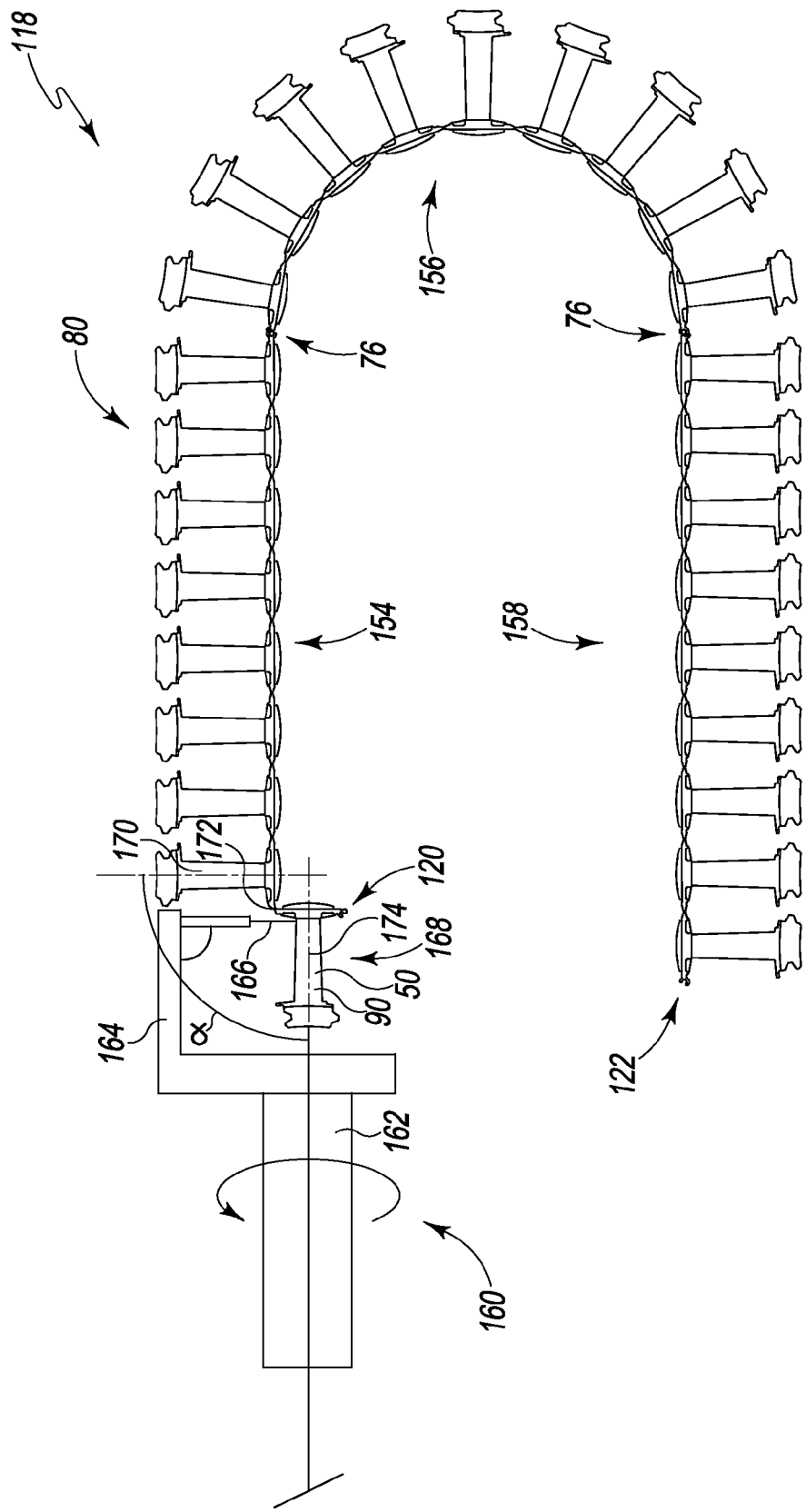
FIG. 5 is a plan view of a process for winding coils of the stator assembly of FIG. 1.

After the stator segment chains 116 are formed, the method 200 advances to block 206 in which the chains 116 are assembled together via the hinge plates 76 to form a single chain 118 (see FIG. 5). In the illustrative embodiment, each hinge plate 76 includes a pair of hinge arms 120, 122 formed on each chain 116 during the injection molding operation. During assembly, the hinge arm 120 of one chain 116 is engaged with the hinge arm 122 of another chain 116 to couple the chains 116 together and form the single chain 118.

As shown in FIG. 4A, each chain 116 of stator segments extends from one longitudinal end 124 to another longitudinal end 126. The hinge arm 120 extends from the longitudinal end 124, while the hinge arm 122 extends from the other longitudinal end 126. The hinge arm 120 includes a body 130 that extends outwardly from a casing 132 positioned at the end 124 of the chain 116. A cylindrical tab or pin 134 is formed on the tip 136 of the body 130. The hinge arm 120 also includes a flange 138 that extends outwardly from the body 130 such that a slot 140 is defined between the flange 138 and the pin 134.

The hinge arm 122 includes a body 142 that extends outwardly from a casing 144 positioned at the end 126 of the chain 116. A pair of flanges 146, 148 extend from the tip 150 of the body 142. As shown in FIG. 4A, a notch 152 is defined between the flanges 146, 148. When the hinge plate 76 is assembled, the notch 152 receives the cylindrical pin 134 of another chain 116, while the slot 140 of the other hinge arm 120 receives the flange 146.

To assemble the chains 116, the cylindrical pin 134 of one chain 154 may be aligned with the notch 152 of another chain 156. The pin 134 of the hinge arm 120 may be advanced into the notch 152 of the hinge 122, thereby assembling the hinge plate 76 and securing the chain 154 to the other chain 156. In that way, the hinge plate 76 is a fastener that joins together the chains 154, 156. Between the chains 154, 156, the hinge plate 76 is the bridge 52 between the adjacent casings 132, 144 of the chains 154, 156. It should be appreciated that a similar operation may be performed with the third chain 158 (see FIG. 5), which is joined to the chain 154 via another hinge plate 76.

Figure 4B:
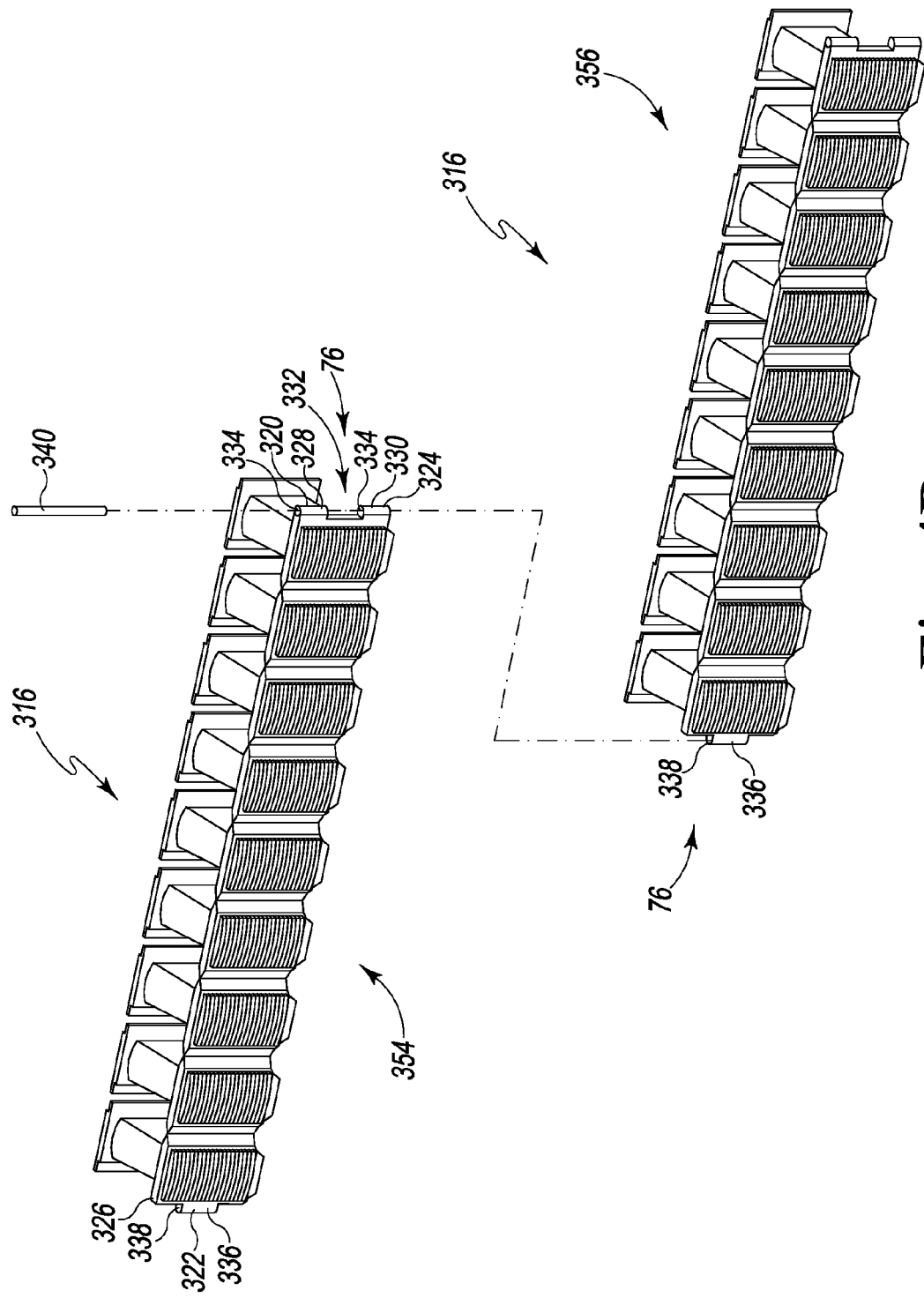
FIG. 4B is a perspective view of other embodiments of stator segment chains.

It should be appreciated that in other embodiments the pin may be formed separately from the stator segment chains. For example, as shown in FIG. 4B, a stator segment chain 316 has includes a hinge plate 76 that has a hinge arm 320 extending from a longitudinal end 324 and another hinge arm 322 extends from the other longitudinal end 326. The hinge arm 320 has a pair of tabs 328, 330 and a slot 332 is defined between the tabs 328, 330. Each of the tabs 328, 330 has a passageway 334 extending therethrough. The other hinge arm 322 has a tab 336 that is sized to be received in the slot 332. Like the tabs 328, 330, the tab 336 has a passageway 338 extending therethrough.

To assemble the chains 316, the tab 336 of one chain 356 is aligned with the slot 332 of another chain 354. The tab 336 is then positioned in the slot 332 such that the passageways 334, 338 of the tabs 328, 330, 336 are aligned. A cylindrical pin 340 is advanced into the aligned passageways 334, 338, thereby securing the chain 354 to the chain 356. It should be appreciated that a similar operation may be performed with the third chain (not shown), which is joined to the chain 354 via another hinge plate 76.

Returning now to FIG. 2, after a single chain 118 of stator segments is assembled, the method 200 may advance to block 208 in which the field coils 72 are attached to the stator segments 80. To do so, the single chain 118 of stator segments may be placed in a coil winding machine 160, as shown in FIG. 5. The machine 160 includes a body 162 and a winding arm 164 extending from the body 162. Each field coil 72 includes a number of coil wires 166 formed from, for example, enameled copper or aluminum. In the illustrative embodiment, coil wire 166 is advanced from the winding arm 164 around each casing 50 of the chain 118 to form the each field coil 72.

When winding a field coil 72, a stator segment 80, such as, for example, a stator segment 168 is pivoted away from an adjacent stator segment 170. The flexible bridge 172 connecting the stator segments 168, 170 bent as the stator segment 168 is pivoted. As shown in FIG. 5, an angle α having a magnitude of approximately 90 degrees is defined between the stator segments 168, 170 when the segment 168 is properly positioned. It should also be appreciated that in other embodiments the angle α may have any magnitude sufficient to open a space large enough to wind the coil around the stator segment 168.

As the coil wire 166 is advanced from the winding arm 164, the machine 160 is rotated about the axis 174 in the direction indicated by arrow 178. While the machine 160 is rotating about the axis 174, the winding arm 164 is advanced along the tooth body 90 of the stator segment 168 such that the coil wire 166 is wrapped around the casing 50 of the stator segment 168 between the base plate 54 and the end plate 58. In that way, one of the field coils 72 is formed. The process may be repeated for each stator segment 168 until all of the field coils 72 of the stator assembly 10 are formed on the stator segment chain 118. In other embodiments, the angle α may have a magnitude of between 15 and 60 degrees. The winding machine 160 may have more than one winding arm or winding head, thereby making it possible to wind more than one coil 72 in the same operation simultaneously. It should be appreciated that in other embodiments a flyer winding machine or other type of coil winding machine may be used to wind the coils.

Returning to FIG. 2, the method 200 may advance to block 210 in which the annular yoke 18 of the stator assembly 10 is formed from the stator segment chain 118. As described above, each stator segment 80 includes a yoke section 84 of the annular yoke 18, and the yoke sections 84 have a groove 96 defined on one side 98 and a dowel 100 extending from the opposite side 102. To assemble the annular yoke 18, the dowel 100 of a stator segment, such as, for example, stator segment 180 shown in FIG. 6 with the groove 96 of an adjacent stator segment 182. The dowel 100 may then be advanced into the groove 96.

Figure 6:
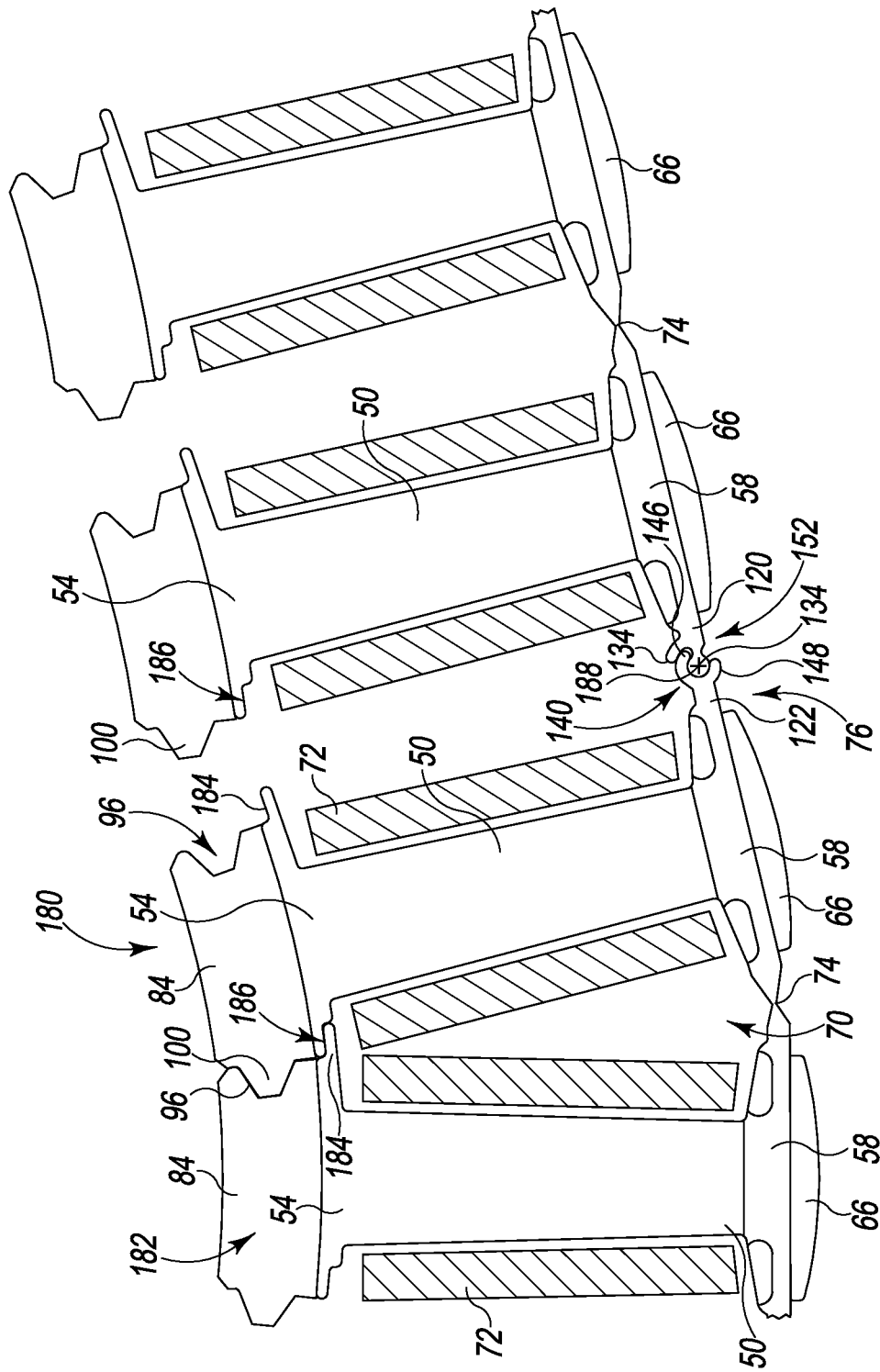
FIG. 6 is a plan view of a process for forming an annular yoke of the stator assembly of FIG. 1.

As the stator segment 180 is engaged with the stator segment 182, the flexible clamping plate 74 connecting the stator segments 180, 182 is arched. When two stator segments 80 are connected by a hinge plate 76, the hinge arms 120, 122 are pivoted about a longitudinal axis 188 defined by the cylindrical pin 134, as shown in FIG. 6. Additionally, a flange 184 extending from the base plate 54 of the stator segment 182 is engaged with the slot 186 formed on the stator segment 180. As shown in FIG. 6, the flange 184 and the slot 186 cooperate with the base plates 54 and end plates 58 of the casing 50 of the segments 180, 182 to enclose the coil slot 70 and the field coils 72 positioned therein. In that way, the field coil 72 positioned in the coil slot 70 is electrically isolated from the exposed metal of the yoke section 84 and shoe 66.

Figure 7:
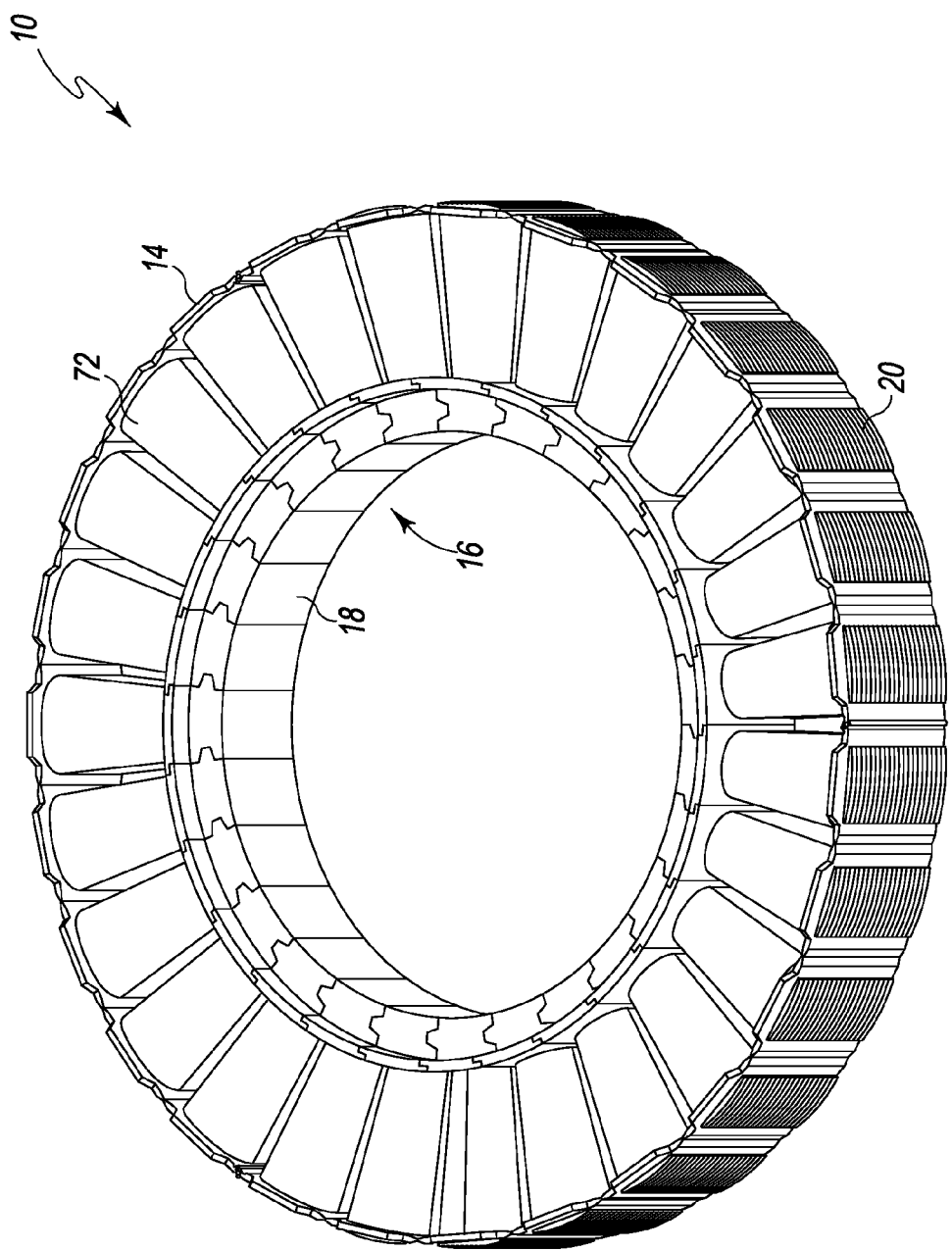
FIG. 7 is a perspective view of the partially formed stator assembly of FIG. 1.

The process of engaging consecutive yoke sections 84 may then be repeated for each stator segment 80 in the chain 118. When the final two stator segments 80 are assembled, the annular yoke 18 is formed, as shown in FIG. 7. The remaining ends of the stator segment chains 156, 158 are also joined, with the cylindrical pin 134 of the segment chain 156 received in the notch 152 of the other chain 158. In the illustrative embodiment, the pins 134 of each hinge plate 76 may be ultrasonically welded into the notches 152. It should be appreciated that in other embodiments the pins 134 may be glued or otherwise fixed to the notches 152. In still other embodiments, no welding or other means may be used to fix the pins 134 to the notches 152.

Returning now to FIG. 2, the method 200 may advance to block 212 in which the central shell 12 is formed over the annular yoke 18. In the illustrative embodiment, the shell 12 is molded over the yoke 18 in an injection molding process. To do so, the annular yoke 18 may be placed in a mold that isolates the annular yoke 18 from the insulator shell 14 and the field coils 72 of the stator assembly 10. A polymeric material is injected into the mold and is permitted to flow over the yoke 18. When the material cools, the central shell 12, including the mounting brackets 28, is formed over only the yoke 18, thereby securing the shell 12 to the stator core 16, as shown in FIG. 1. In the illustrative embodiment, no part of the central shell 12 engages or contacts the insulator shell 14 and field coils 72. In other embodiments, the central shell 12 may be formed from a metallic material, such as, for example, zinc or aluminum. After the central shell 12 is formed, the method 200 may then continue with further processing, including the attachment of electrical terminals 190 to the central shell 12 and assembly of the wire harness (not shown).

As described above, each stator segment of the stator assembly may be overmolded separately and later assembled into a chain of stator segments. Referring now FIGS. 8 and 9, an exemplary embodiment of such a stator segment (hereinafter stator segment 380) is shown. Some features of the embodiment illustrated in FIGS. 8 and 9 are substantially similar to those discussed above in reference to the embodiments of FIGS. 1-7. Such features are designated in FIGS. 8 and 9 with the same reference numbers as those used in FIGS. 1-7.

As shown in FIG. 8, the stator segment 380 includes a segment body 82 and a shoe 66 that is secured to the segment body 82. The segment body 82 of each stator segment 380 includes a yoke section 84 and one tooth 86 of the plurality of teeth 20. The yoke section 84 has a base 88, and the tooth 86 has a tooth body 90 that extends from an end 92 attached to the base 88 to an end 94. The base 88 has a groove 96 defined on one side 98 thereof and a dowel 100 that extends outwardly from the opposite side 102 thereof. The tooth head or shoe 66 is secured to the end 94 of the tooth 86.

A shell section 382 of the insulator shell 314 of the stator assembly is formed over the stator segment 380. In the illustrative embodiment, the shell 14 is formed in an injection molding process. To do so, a stator segment 380 may be placed in a mold. A polymeric material in liquid form is injected into the mold and is permitted to flow over the tooth body 90 and the shoe 66 of the stator segment 380. The mold is configured such that the yoke section 84 is isolated from the polymeric material. When the material cools, a casing 350 is formed over the tooth body 90 and the shoe 66 of each stator segment 380. As shown in FIG. 8, the yoke section 84 of each stator segment 380 is devoid of polymeric material.

The stator segments 380 are assembled via hinge plates 386 to form a single chain 388 of stator segments. In the illustrative embodiment, each hinge plate 386 includes a pair of hinge arms 120, 122 formed on the stator segment 380 during the injection molding operation. During assembly, the hinge arm 120 of one stator segment 380 is engaged with the hinge arm 122 of another stator segment 380 to couple the stator segments 380 together.

As shown in FIG. 8, the hinge arm 120 extends from one side 390 of the casing 350 of the shoe 66 of the segment 380, while the hinge arm 122 extends from the other side 394 of the casing 350. The hinge arm 120 includes a body 130 that extends outwardly from the casing 392, and a cylindrical tab or pin 134 is formed on the tip 136 of the body 130. The hinge arm 120 also includes a flange 138 that extends outwardly from the body 130 such that a slot 140 is defined between the flange 138 and the pin 134.

The other hinge arm 122 includes a body 142 that extends outwardly from the casing 350. A pair of flanges 146, 148 extend from the tip 150 of the body 142. As shown in FIG. 8, a notch 152 is defined between the flanges 146, 148. When the hinge plate 386 is assembled, the notch 152 receives the cylindrical pin 134 of another stator segment 380.

To assemble the stator segments 380, the cylindrical pin 134 of one stator segment 400 may be aligned with the notch 152 of another segment 402, as shown in FIG. 9. The pin 134 of the hinge arm 120 may be advanced into the notch 152 of the hinge arm 122, thereby assembling the hinge plate 386 and securing the segment 400 to the other segment 402. In that way, the hinge plate 386 is a fastener that joins together the segments 400, 402 and is the bridge 52 between those stator segments. It should be appreciated that a similar operation may be performed with successive stator segments to form the complete stator segment chain 388 of the stator assembly. After the field coils 72 are attached to the chain 388 and the chain 388 is bent to form the annular yoke, the pins 134 of each hinge plate 386 may be ultrasonically welded into the notches 152. It should be appreciated that in other embodiments the pins 134 may be glued or otherwise fixed to the notches 152.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A method of manufacturing a stator for a washing machine, the method comprising:
   forming a plurality of stator segments, each stator segment including (i) a yoke section, (ii) a tooth body extending outwardly from the yoke section to an end, and (iii) a shoe at the end of the tooth body, forming a polymeric casing on each stator segment before engaging the yoke sections to form an annular yoke, each polymeric casing extending over only the tooth body and the shoe of the stator segment such that the yoke section of the stator segment is devoid of polymeric material, wherein forming the polymeric casing includes: (i) overmolding a first number of stator segments of the plurality of stator segments with polymeric material to form a first chain of stator segments having a pin formed at a first shoe of the first chain, and (ii) overmolding a second number of stator segments of the plurality of stator segments with polymeric material to form a second chain of stator segments having a notch formed at a last shoe of the second chain, each stator segment of the first chain and the second chain being connected by a polymeric bridge, connecting the first shoe of the first chain with the last shoe of the second chain by positioning the pin of the first chain in the notch of the second chain to form a polymeric bridge between the first shoe of the first chain and the last shoe of the second chain before engaging the yoke sections of the stator segments, engaging the yoke sections of the stator segments to form an annular yoke, and forming a central shell on the annular yoke, the central shell including a plurality of bores for mounting the stator, wherein a polymeric bridge extends between adjacent polymeric casings and connects the shoes of adjacent stator segments.

2. The method of claim 1, wherein forming the polymeric casing on each stator segment includes overmolding a plurality of stator segments with polymeric material, wherein the polymeric bridges are formed integrally with the polymeric casings.

3. The method of claim 1, wherein forming the polymeric casing on a stator segment includes forming a tab on a first side of the shoe of the stator segment and forming a notch on a second side of the shoe of the stator segment.

4. The method of claim 3, further comprising assembling a chain of stator segments by positioning the tab of a first stator segment in a notch of a second stator segment.

5. The method of claim 1, further comprising forming the polymeric bridge between each stator segment by welding adjacent polymeric casings.

6. The method of claim 1, further comprising forming the polymeric bridge between each stator segment by gluing adjacent polymeric casings.

7. The method of claim 1, wherein overmolding the first number of stator segments and overmolding the second number of stator segments includes:

forming a first passageway at one end of the first chain, forming a second passageway at one end of the second chain, and connecting the first shoe of the first chain with the last shoe of the second chain includes positioning a pin in the first passageway of the first chain and in the second passageway of the second chain to form the polymeric bridge between the first shoe of the first chain and the last shoe of the second chain.

8. The method of claim 1, further comprising winding a coil around each tooth body after forming the polymeric casing.

9. The method of claim 1, wherein engaging the yoke sections of the stator segments includes positioning a tab of the yoke section of a first stator segment in a groove formed in the yoke section of a second stator segment.

10. The method of claim 1, wherein forming the central shell on the annular yoke includes overmolding the annular yoke.

11. A method of manufacturing a stator for a washing machine, the method comprising:

forming a plurality of stator segments, each stator segment including (i) a yoke section, (ii) a tooth body extending outwardly from the yoke section to an end, and (iii) a shoe at the end of the tooth body, overmolding a first number of stator segments of the plurality of stator segments with polymeric material to form (i) a first chain of stator segments, (ii) a pin at one end of the first chain, and (iii) a polymeric casing on each stator segment of the first chain, overmolding a second number of stator segments of the plurality of stator segments with polymeric material to form (i) a second chain of stator segments, (ii) a notch formed at one end of the second chain, and (iii) a polymeric casing on each stator segment of the second chain, connecting a first shoe of the first chain with a last shoe of the second chain by positioning the pin of the first chain in the notch of the second chain to couple the first shoe of the first chain to the last shoe of the second chain and form a polymeric bridge between the first shoe of the first chain and the last shoe of the second chain, after connecting the first shoe of the first chain with the last shoe of the second chain, engaging the yoke sections of the stator segments to form an annular yoke, and forming a central shell on the annular yoke, the central shell including a plurality of bores for mounting the stator, wherein (i) each polymeric casing extends over only the tooth body and the shoe of each stator segment such that the yoke section of the stator segment is devoid of polymeric material and (ii) a polymeric bridge extends between adjacent polymeric casings and connects the shoes of adjacent stator segments.

12. The method of claim 11, further comprising winding a coil around each tooth body after forming the polymeric casing.

13. The method of claim 11, wherein forming the central shell on the annular yoke includes overmolding the annular yoke.

14. A method of manufacturing a stator for a washing machine, the method comprising:

forming a plurality of stator segments, each stator segment including (i) a yoke section, (ii) a tooth body extending outwardly from the yoke section to an end, and (iii) a shoe at the end of the tooth body, overmolding a first number of stator segments of the plurality of stator segments with polymeric material to form (i) a first chain of stator segments, (ii) a first passageway at one end of the first chain, and (iii) a polymeric casing on each stator segment of the first chain, overmolding a second number of stator segments of the plurality of stator segments with polymeric material to form (i) a second chain of stator segments, (ii) a second passageway at one end of the second chain, and (iii) a polymeric casing on each stator segment of the second chain, connecting a first shoe of the first chain of stator segments with a last shoe of the second chain of stator segments by positioning a pin in the first passageway of the first chain and in the second passageway of the second chain to couple the first shoe of the first chain to the last shoe of the second chain, after connecting the first shoe of the first chain with the last shoe of the second chain, engaging the yoke sections of the stator segments to form an annular yoke, and forming a central shell on the annular yoke, the central shell including a plurality of bores for mounting the stator, wherein (i) each polymeric casing extends over only the tooth body and the shoe of each stator segment such that the yoke section of the stator segment is devoid of polymeric material and (ii) a polymeric bridge extends between adjacent polymeric casings and connects the shoes of adjacent stator segments.

15. The method of claim 14, further comprising winding a coil around each tooth body after forming the polymeric casing.

16. The method of claim 14, wherein forming the central shell on the annular yoke includes overmolding the annular yoke.

\* \* \* \* \*